(12) United States Patent
Bricker et al.

(10) Patent No.: US 9,796,051 B2
(45) Date of Patent: Oct. 24, 2017

(54) METHOD AND TOOLS FOR WELDING A VEHICLE COMPONENT

(71) Applicant: METALSA S.A. DE C.V., Apodaca (MX)

(72) Inventors: David Bricker, Elizabethtown, KY (US); Marvin Lewis Adams, Elizabethtown, KY (US); Juan Villarreal Garcia, Saltillo (MX); Jason Belcher, Cecilia, KY (US); Troy Fackler, Vine Grove, KY (US)

(73) Assignee: METALSA S.A. DE C.V., Apodaca (MX)

( * ) Notice: Subject to any disclaimer, the term of this patent is extended or adjusted under 35 U.S.C. 154(b) by 228 days.

(21) Appl. No.: 14/619,904

(22) Filed: Feb. 11, 2015

(65) Prior Publication Data

US 2015/0239067 A1 Aug. 27, 2015

Related U.S. Application Data

(60) Provisional application No. 61/944,005, filed on Feb. 24, 2014, provisional application No. 61/944,001, filed on Feb. 24, 2014.

(51) Int. Cl.
*B23K 31/00* (2006.01)
*B23K 31/02* (2006.01)
(Continued)

(52) U.S. Cl.
CPC ............... *B23K 31/02* (2013.01); *B23K 9/02* (2013.01); *B23K 9/16* (2013.01); *B23K 37/0229* (2013.01);
(Continued)

(58) Field of Classification Search
CPC ............. B23K 2201/006; B23K 31/02; B23K 37/0443; B23K 37/0461; B23K 37/0435
(Continued)

(56) References Cited

U.S. PATENT DOCUMENTS

| 3,362,056 A | 1/1968 | Preller et al. |
| 3,940,162 A | 2/1976 | Winslow et al. |

(Continued)

FOREIGN PATENT DOCUMENTS

| GB | 1102410 A | 2/1968 |
| WO | 9301080 A1 | 1/1993 |
| WO | 2006021679 A1 | 3/2006 |

OTHER PUBLICATIONS

International Search Report for International Application No. PCT/IB2015/000596, dated Oct. 5, 2015, 3 pages.
(Continued)

*Primary Examiner* — Erin Saad
(74) *Attorney, Agent, or Firm* — Michael Best & Friedrich LLP

(57) ABSTRACT

A welding method and system (4) using a robotic arm (10), a welding robot (18) and a welding table (2) placed at an angle from horizontal to hold two C-channels (6 and 8) facing each other to maintain position and be welded together. C-channels (6 and 8) face each other to form a closed channel at increased welding speed with less materials having resulting benefits including constant welding, less distortion, and less welding material. Welding begins with restraining C-channels (6 and 8) in conjunction with the angled welding table (2). A robotic arm (10) handles C-channels (6 and 8) to move, place and restrain them relative to each other and the welding table (2). A pressing tool (12) may be a set of pressure-exerting tools (26). A welding robot
(Continued)

(18) with a seam finding system (24) preferably welds the restrained C-channels (6 and 8) from top to bottom.

12 Claims, 2 Drawing Sheets

(51) Int. Cl.
*B23K 37/00* (2006.01)
*B23K 37/04* (2006.01)
*B23K 9/02* (2006.01)
*B23K 9/16* (2006.01)
*B23K 37/02* (2006.01)
*B23K 101/00* (2006.01)
*B23K 103/04* (2006.01)

(52) U.S. Cl.
CPC ...... *B23K 37/0443* (2013.01); *B23K 37/0461* (2013.01); *B23K 2201/006* (2013.01); *B23K 2203/04* (2013.01); *Y10S 901/42* (2013.01)

(58) Field of Classification Search
USPC .............................. 228/43, 47.1, 49.1, 49.4
See application file for complete search history.

(56) References Cited

U.S. PATENT DOCUMENTS

| | | | |
|---|---|---|---|
| 4,697,838 A | 10/1987 | Hartman |
| 4,726,166 A | 2/1988 | DeRees |
| 4,848,835 A | 7/1989 | DeRees |
| 5,322,208 A | 6/1994 | Hinrichs et al. |
| 5,380,978 A | 1/1995 | Pryor |
| 6,010,155 A | 1/2000 | Rinehart |
| 6,026,573 A | 2/2000 | Macchione |
| 6,220,502 B1 | 4/2001 | Gallinger et al. |
| 6,301,763 B1 | 10/2001 | Pryor |
| 6,398,260 B1 | 6/2002 | Rinehart |
| 6,398,262 B1 | 6/2002 | Ziech et al. |
| 6,412,818 B1 | 7/2002 | Marando |
| 6,422,604 B2 | 7/2002 | Lapic |
| 6,477,774 B1 | 11/2002 | Marando et al. |
| 6,488,791 B1 | 12/2002 | Powers, II |
| 6,513,242 B1 | 2/2003 | Christofaro et al. |
| 6,525,294 B1 | 2/2003 | Kipping et al. |
| 6,733,040 B1 | 5/2004 | Simboli |
| 7,144,040 B2 | 12/2006 | Kiehl et al. |
| 7,192,081 B2 | 3/2007 | Tijerina et al. |
| 7,578,060 B2 | 8/2009 | Durand |
| 7,614,151 B2 | 11/2009 | Miller |
| 7,717,498 B2 | 5/2010 | Fleming |
| 7,857,348 B2 | 12/2010 | Fleming |
| 7,862,085 B2 | 1/2011 | Xu et al. |
| 7,926,848 B2 | 4/2011 | Sherbeck et al. |
| 8,485,555 B2 | 7/2013 | Hunt |
| 2005/0044700 A1 | 3/2005 | Ghuman et al. |
| 2009/0071281 A1 | 3/2009 | Fisk et al. |
| 2012/0072021 A1 | 3/2012 | Walser et al. |
| 2012/0304446 A1* | 12/2012 | Kilibarda ............. B23P 21/004 29/430 |
| 2014/0061168 A1 | 3/2014 | Nakakura et al. |
| 2014/0252807 A1 | 9/2014 | Medina et al. |

OTHER PUBLICATIONS

Written Opinion of the International Searching Authority for International Application No. PCT/IB2015/000596, dated Oct. 5, 2015, 6 pages.
International Search Report for International Application No. PCT/IB2015/001036, dated Nov. 4, 2015, 2 pages.
Written Opinion of the International Searching Authority for International Application No. PCT/IB2015/001036, dated Nov. 4, 2015, 4 pages.
International Search Report for International Application No. PCT/IB2015/001096, dated Nov. 12, 2015, 2 pages.
Written Opinion of the International Searching Authority for International Application No. PCT/IB2015/001096, dated Nov. 12, 2015, 4 pages.

* cited by examiner

METHOD AND TOOLS FOR WELDING A VEHICLE COMPONENT

CROSS-REFERENCE TO RELATED APPLICATIONS

This application claims priority to and all benefits of U.S. Provisional Application 61/944,005 entitled "Method and Tool for Welding an Automotive Component," and U.S. Provisional Application 61/944,001, entitled "Set of Tools Adaptable to a Robotic Arm for Snapping Manufacture Components During the Welding Process, and Process Thereof," both filed on Feb. 24, 2014, which are incorporated herein by reference.

FIELD OF THE DISCLOSURE

This disclosure relates to a high-speed welding method and its related tools. More specifically, the disclosure relates to welding steel components, such as inwardly facing C-channels, to create an automotive structural component, such as a side rail.

BACKGROUND

Apparatus and processes have been devised for welding steel components for structural automotive components. Parts, such as side rails, are presently created by welding together two steel C-channels, which are formed from a steel coil or blank. Welding operations are commonly performed at specific tables or plate-like surfaces where steel components are manually or automatically welded.

In large welding operations, such as those in the automotive industry, high flexibility operations are of great concern. Flexibility is pursued by creating tools and operations that may be utilized for welding several different components and by minimizing the amount of adjustments needed to be done to the tool before changing from one component type to another.

FANUC robots are known for arc welding operations. The FANUC ARC Mate Series model robots are versatile for automated welding processes.

Previous efforts have been tried to optimize the amount of welding material used within a welding operation and to increase the speed at which the welding operation is performed, specifically regarding vertical anchoring tools. Vertical anchoring tools are devices designed to hold two components together at a vertical angle and which allow a welding robot to perform a welding operation from the top to the bottom of the joining of such components. Vertical angles allow faster welding operations and therefore, decrease the amount of welding material used without decreasing the quality of the joining One drawback of vertical welding is that the components must be held in place by securing anchors whereby the welding robot must pass over the securing anchors holding the components in place leaving gaps that must be welded later. These vertical anchoring tools are often avoided by large welding operations due to their high cost and high specialty configuration.

A wide range of machinery and tool-machinery in the technical field are used for manufacturing numerous components of the metalworking industry. This diversity of elements includes robotic arms, which ease the automation of the manufacturing and assembly lines through many features. Moreover, some of these robotic arms are adapted or arranged for coupling and controlling several sets of tools specialized for performing these features. Furthermore, currently, during the automated welding process, it is necessary to hold or fix each piece when the electrode appropriately performs the welding process. For such end, a holding machine is adapted for holding the pieces, with pressure-exerting (snapping) elements that are defined for such component or work piece, so that the machine must be rearranged for each new work piece or component. The above involves actions and resources for the rearrangement, and also limits the welding process to necessarily making batches of the same piece.

In this regard, there is a need for a set of tools that allows for the pressure-exerting features during the welding process of several components and pieces. Likewise, there is a need for the set of tools to comprise pressure-exerting elements that may be adapted to the shape and profile of each work piece. Furthermore, the set of tools should be adaptable both mechanically and electronically to a robotic arm.

The present disclosure presents an alternative method and its corresponding tools for welding automotive components, specifically C-channels, wherein such method presents substantial benefits in welding speed and welding material with a higher degree of operational flexibility. Additionally, the method presents benefits regarding the welded component weight.

SUMMARY AND OBJECTS OF THE DISCLOSURE

The present disclosure provides a welding method and its corresponding tools for welding steel automotive components, both well-suited for C-channels to form a side rail of a vehicle.

The present disclosure is directed to provide higher speed and welding material reduction in the welding operation of a vehicle frame member created from C-channels facing each other to create a closed channel. The first and second channels may vary in thickness and dimensions according to the automotive component specifications.

In a preferred embodiment, two C-channels are made from steel and placed at an approximate 55° angle, as shown on FIG. 1, and are welded together by an automatic welding operation from top to bottom continuously to increase the welding speed and decrease the welding material without incurring a high degree of specialty needed in the tool. Such fixed table systems are designed for applications that avoid the added complexity of part-rotation with repositioning turntable systems that provide a rotating or repositioning work piece. Per this disclosure, each C-channel can be set in place to be welded without movement during the welding operation.

A seam finding system, such as vision, laser, and touch-sense, allow for precise welding operations with minimal excessive welding material being needed. A specially adapted seam finding system may include a vision system with cameras or optic viewers. A camera-vision system may sense and measure the seam or gap between the first and second C-channels to allow the precise location of welding and the exact amount of welding materials to be used. A seam finding system can assist with adaptive welding, seam tracking, adjustment, and automated inspection of the welding processes.

The seam finding system and top-to bottom downhill welding, such as on an angled welding table, reduce over-welding at the joint of the C-channels, and therefore, reduce the amount of welding material being used. While over-welding is a common practice to guarantee proper assembly, it is generally not desired by customers.

In the broader aspects of this disclosure, the welding operation is performed by a welding robot that joins the C-channels by relying on a previously programmed welding instruction. Such instructions can be specifically prepared to adjust the tools for each change of welding one component type to another.

Another useful concept to achieve high-speed welding is a set of tools that adapts to robotic arms for holding different shaped pieces or C-channels during the welding process. The set of pressure-exerting tools (previously snapping set of tools) avoids clamping of the tooling to avoid intrusive clamping systems and jumping over clamps by the welder. This provides a constant and preferably continuous welding operation without skipping an area or shifting the welder.

The set of pressure-exerting tools is ideally adapting to the profile of a C-channel for holding the work piece during a welding process. The set of pressure-exerting tools includes an adaptable connection and a main body. The adaptable connection connects the set of tools to a robotic arm, while the main body holds a C-channel against a workbench, such as a welding table. The main body includes a support frame that has a first end that holds a first hydraulic clamp, a second end that holds a second hydraulic clamp, a plurality of snapping elements actuated by the hydraulic clamps, and at least one presence sensor. When the presence sensor identifies appropriate proximity with the C-channel, the hydraulic clamps are actuated for moving the snapping elements that will exert an appropriate pressure for preventing the movement of the C-channel.

The welding method and the tools used weld together two C-channels provide substantial benefits in operational speed and welding material used, as compared to horizontal welding operations currently used in the state of the art. The combination of three specific concepts, including (1) seam finding systems, (2) angular downhill welding, such as on an angled welding table, and (3) and a set of pressure-exerting tools to press one C-channel against the other, allow large-scale production operations to achieve high-speed welding.

Also, the welding method and the tools provide a weight savings to the welded automotive component due to the decrease in the welding material used to join the two C-channels that form the automotive component. Any weight savings without sacrificing strength is desired in vehicle manufacturing.

BRIEF DESCRIPTION OF THE DRAWINGS

The above-mentioned and other features of this disclosure and the manner of obtaining them will become more apparent, and the disclosure itself will be best understood by reference to the following descriptions of tools and processes taken in conjunction with the accompanying figures, which is given as a non-limiting example only, in which.

The examples set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, as described herein in detail, embodiments with the understanding that the present descriptions are to be considered exemplifications of the principles of the disclosure and are not intended to be exhaustive or to limit the disclosure to the details of construction and the arrangements of components set forth in the following description or shown in the figures.

High speed adaptive welding uses welding robots and robotic arms to place/position parts and robot welding for speed, precise alignment, and less filler materials with versatile tools. The disclosed process and tools are well-suited for side rails of a vehicle.

Figure 1:
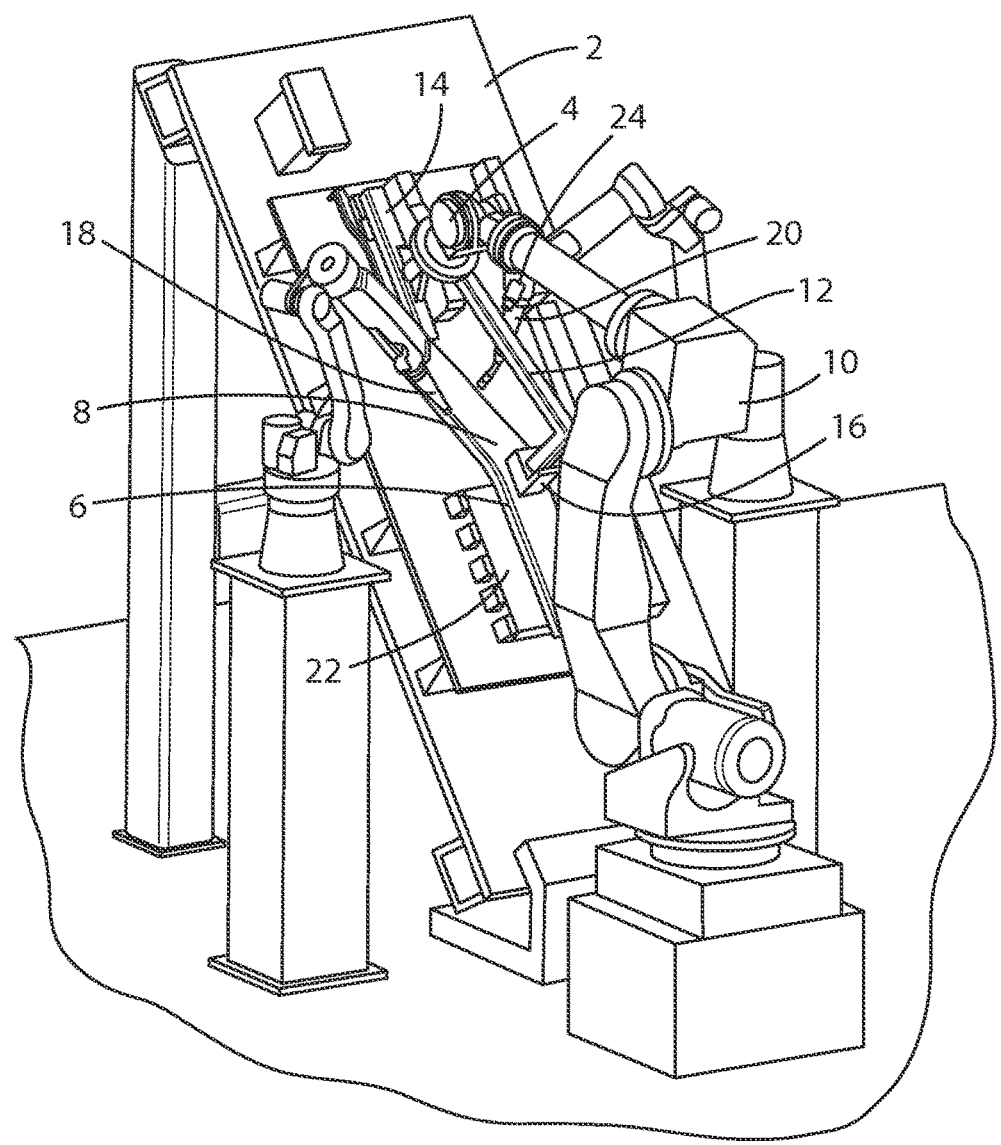
FIG. 1 shows a perspective view of a 55° angle welding table and its tool to perform a welding operation of two components as described in the present disclosure.

As shown in FIG. 1, a welding table (2) and its corresponding system (4) operate at an angle to hold the two C-channels (6, 8) facing each other. The angle of the slope of the welding table (2) is less than 90 degrees, but preferably varies between 45° and 65° from horizontal, with 55° being a preferred angle as shown. The fixed table is preferred to avoid the complexities of applications that require part-rotation or repositioning of either C-channel during welding.

A robotic arm (10) can pick, place and sometimes hold the C-channels (6 and 8), in this case at different times. The robotic arm (10) handles the C-channels (6 and 8) as work pieces. The first C-channel (6) may be picked and securely placed first on the welding table (2) on the bottom directly on the welding table (2). The same robotic arm (10) can automatically place the second C-channel (8) on top of the first C-channel (6) and hold it in place. C-channels (6, 8) are placed and held having their cavities facing toward each other, which in other words is inwardly facing. Thus, the corresponding edges of the lips along the C-channels (6, 8) align to be welded together.

The first C-channel (6) may be placed in a holding element (22) on the welding table (2). The height from the welding table (2) of the holding element (22) is less than each lip of first C-channel (6) so the edge of the first C-channel (6) is exposed and accessible by the welding robot (18) and preferably a second welding robot (20) on the other side. The second C-channel (8) may be held in position by being pressed toward the welding table (2) by a pressing tool (12) held by a robotic arm (10) to guarantee that the C-channels (6, 8) are maintained in a desired position. Example channel grasps (14 and 16) of the pressing tool (12) are narrow enough to fit in the cavity of first C-channel (6) and then away from the edges of the second C-channel (8) while being moved and held in position against the first C-channel (6).

While held together, the C-channels (6, 8) are welded together by a welding robot (18), which may perform an automatic welding operation per programmed code. Robot welding includes the use of mechanized programmable tools (i.e. robots), to automate a welding process by both performing the weld and holding the C-channels (6, 8).

In a preferred embodiment, a welding robot (18 and 20) is on each side of the welding table (2). Ideally, two welders concurrently weld on opposite sides of the C-channels (6 and 8) while being joined. Concurrently operating welding robots (18 and 20) are quicker than sequential welding.

The welding table (2) sloped at an approximate 55° angle provides a substantial increase in the welding speed, such as more than 25% quicker than traditionally horizontal welding operations, and a substantial decrease in the amount of welding material used, such as more than 25% of welding material savings. Additionally, due to the decrease in welding material being used, the final vehicle component presents substantial savings in weight compared to a similar component being welded with a traditional horizontal welding table and tool.

In the broader aspects of this disclosure, the two C-channels (6 and 8) can be formed using traditional methods, such as roll-forming, stamping or break press, to provide primary sectional stiffness. C-channels (6 and 8) may be made from steel, either heat treated or high strength low alloy (HSLA) steel and may each be made as one continuous piece.

The process includes a series of steps of manufacturing that transform articles as two C-channels (6 and 8) from one state to another as a resulting structural component, such as a side rail. The process includes a way to use a system (4) to accomplish a given result implemented by one or more welding robots (18 and 20) with an angled welding table (2) with the corresponding system (4) having a robotic arm (10) and other elements.

A process for welding two C-channels (6 and 8) and a more particular method of manufacturing a side-rail for a vehicle having joined first C-channel (6) and second C-channel (8) with cavities of the C-channels (6 and 8) inwardly facing begins with restraining first C-channel (6) and second C-channel (8) facing each other in conjunction with angled welding table (2), such as fixed at an angle approximately 55° from horizontal throughout the process.

Further, a robotic arm (10) handles the C-channels (6 and 8) to move, place and restrain them relative to the welding table (2). In a preferred step, the robotic arm (10) places the first C-channel (6) on the welding table (2), such as in a holding element (22). Then, the robotic arm (10) handles the second C-channel (8) and places it with cavities and edges aligned with the first C-channel (6) and holds the second C-channel (8) in place during the welding operation, without interfering with the welding robot (18).

Then, the welding robot (18) and a second welding robot (20) on an opposite side of the welding table (2) preferably concurrently weld from top to bottom to join both sides of the restrained C-channels (6 and 8) along the entire length on each side, which ideally is a continuous welding operation, such as to form the side-rail.

With the channel grasps (14 and 16) of a pressing tool (12) on the center portion of the second (top) C-channel (8) away from the edges to be welded, the top-to-bottom (at an angle such as 55 degrees) welding can be constant and preferably continuous for high speed with less welding material. A holding clamp is not in the way of welding. Performing the welding operation from top to bottom to join the C-channels (6 and 8) is preferred. With the channel grasps (14 and 16) away from the edges to be welded, the welding robot (18 and/or 20) does not need to jump over holding clamps (avoiding an unwelded area) and does not need to stop or slow down. With such continuous welding operations from top to bottom between the entire length of the C-channels (6 and 8), there is no need to go back and weld unwelded areas either by another robotic operation or later manually. With high speed adaptive welding, the C-channel (6) is easier to hold with less distortion and less heat that might cause twisting during welding, which herein is continuous from top to bottom.

The robotic arm (10) or welding robots (18 and 20) may include a specially adapted seam finding system (24). A seam finding system (24), such as vision, laser, and touch-sense, allow for precise welding operations with minimal excessive welding material being needed. A vision system with cameras or optic viewers, as an example may be on the wrist at the end of the arm of the welding robots (18 and 20). A camera-vision system may sense and measure the area to be welded (minimized gap) as a seam between the first and second C-channels (6, 8) to allow the precise location of welding and the exact amount of welding materials to be used. The seam finding system (24) can obtain a picture of the exact location so the welding robots (18 and 20) know exactly where to go to weld. A seam finding system (24) can assist with adaptive welding, seam tracking, adjustment, and automated inspection of the welding processes. A robotic system may weld a pre-programmed position, be guided by machine vision, or by a combination of the two methods.

Each resulting structural component includes the first C-channel (6) joined to the second C-channel (8) with cavities of the first C-channel (6) and the second C-channel (8) facing each other to form a preferred closed side rail when joined together. The shape and length of C-channels (6 and 8) can vary according to the structural component and vehicle requirements. The length and thickness of the first C-channel (6) and the second C-channel (8) can be adjusted according to vehicle requirements and specifications. The first and second C-channels (6 and 8) may vary in height depending on stiffness and other characteristics required.

Set of Pressure-Exerting Tools

Figure 2:
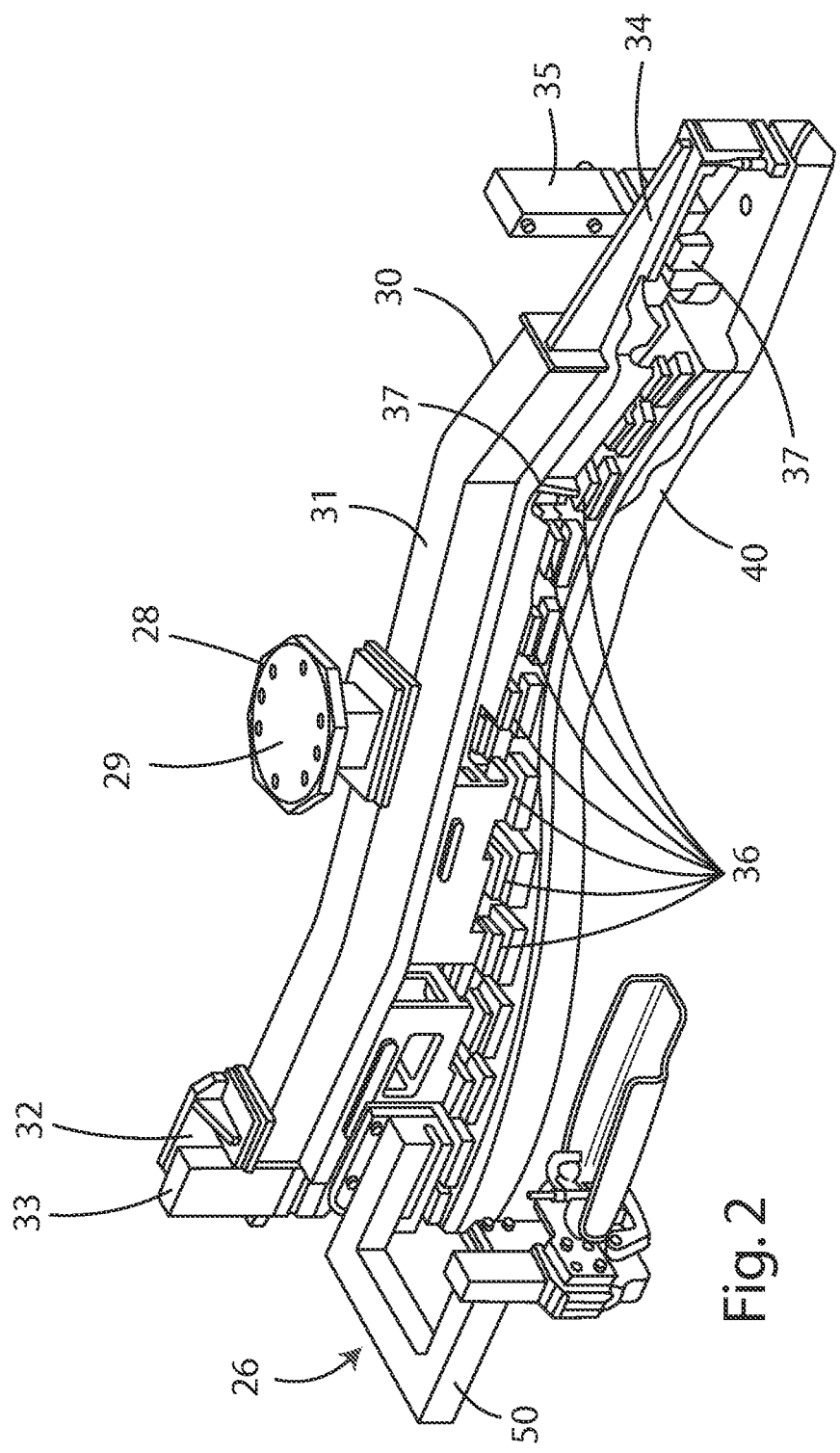
FIG. 2 is a left front top perspective view of an embodiment of the set of pressure-exerting tools according to the present disclosure.

The pressing tool (12) may be a set of pressure-exerting tools (26) for holding a piece during the welding process is shown in a preferred embodiment in FIG. 2. Generally, the set of pressure-exerting tools (26) has two main elements: an adaptable connection (28) and a main body (30). The adaptable connection (28) connects the set of tools to a robotic arm (10), while the main body (30) holds one side of at least one work piece (40), such as a C-channel (6 or 8). In turn, the work piece (40) may be provided over the welding table (2) in such a way that the main body (30) fixes the work piece against the welding table (2). It is to be noted that throughout this specification, work piece means one or more components that will undergo a welding process. Preferably, the work piece (40) may be a scar cap for the automotive industry and correspond to first and second C-channels (6, 8).

As shown in FIG. 2, the pressing tool (12) has the adaptable connection (28) with mechanical coupling elements (29) to a robotic arm (10). Preferably, the mechanical coupling elements (29) include a modular counterbearing. Additionally, the adaptable connection (28) comprises electronic attachment elements (not shown) for controlling the set of pressure-exerting tools (26) by means of the robotic arm (10). Preferably, the electronic connection elements include jacks and clips. The adaptable connection (28) is connected to an area of the main body (30), such as in the middle of the main body (30) as shown.

The embodiment has the main body (30) consisting of the main part of the set of pressure-exerting tools (26). The main body (30) includes a support frame (31). Preferably, the support frame (31) is provided with a defined length for adapting same to one or more sets of work pieces. In this embodiment, the support frame (31) is adapted to a work piece (40) of a substantial length with curved areas. The support frame (31) has a first end (32) that allows the housing of a first hydraulic clamp (33). The support frame (31) further has a second end (34) that allows the housing of a second hydraulic clamp (35). Furthermore, the support frame (31) has a plurality of snapping elements (36) actuated by the hydraulic clamps (33, 35). The plurality of snapping elements (36) preferably follows a curve of the support frame (31) that is curved. Additionally, the support frame (31) also has at least one presence sensor (37) in a portion appropriate for determining the correct measure of the presence or absence of the work piece (40). Finally, the support frame (31) may also have an additional support frame (50) attached to it for performing specific actions over certain work pieces.

During its operation, the set of pressure-exerting tools (26) couples to a robotic arm (10) by means of the adaptable connection (28). A work piece (40) is provided over a welding table (2). The set of pressure-exerting tools (26) approaches the work piece (40) until the presence sensor (37) identifies proximity with the work piece (40). When the set of pressure-exerting tools (26) has appropriate proximity with the work piece (40), the hydraulic clamps (33, 35) are actuated for moving the plurality of snapping elements (36) toward the uncovered position of the work piece (40). The plurality of snapping elements (36) will exert an appropriate pressure for preventing the movement of the work piece (40). Once the work piece (40) is fastened by the set of pressure-exerting tools (26) of the present disclosure, the welding process over the work piece (40) may be performed.

The set of pressure-exerting tools (26) can be used with a combination robot that performs multiple functions, such as securing, loading, placing, and holding a work piece and then performing the welding operation with another element on the same robotic arm.

The set of pressure-exerting tools (26) avoids clamping of the tooling in order to avoid intrusive clamping systems and jumping over clamps by the welder. This provides a constant and continuous welding operation without skipping an area or shifting the welder.

The speed welding process in a high-speed production operation is ideally achieved with the combination of three specific concepts, including (1) seam finding systems (vision, laser, touch-sense), (2) angular downhill welding, such as on an angled welding table, and (3) and a set of pressure-exerting tools to hold one C-channel adjacent the other.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. A process for welding two C-channels (6 and 8) comprising the steps of:
  restraining a first C-channel (6) and a second C-channel (8) facing each other against a surface of a welding table (2) that is sloped at an angle from horizontal, wherein the first C-channel (6) is held on the welding table (2), under the second C-channel (8), by a holding element (22) that leaves lip edges of the first C-channel (6) exposed;
  holding the second C-channel (8) against the first C-channel (6) with a set of pressure-exerting tools (26) on a robotic arm (10);
  using a seam finding system (24) to sense an area to be welded between the first and second C-channels (6, 8) so a welding robot (18) knows precisely where to weld; and
  performing a welding operation with the welding robot (18) from top to bottom to join the restrained first and second C-channels (6 and 8), wherein the second C-channel (8) is held with the set of pressure-exerting tools (26) during the welding operation.

2. The process of claim 1 wherein the angle is between 45° and 65° from horizontal, the process further comprising holding the angle fixed throughout the welding operation.

3. The process of claim 1 wherein the welding operation includes a second welding robot (20) on an opposite side of the welding table (2) that performs continuous welding on an opposite side of the first and second C-channels (6 and 8) from top to bottom to join the other side of the first and second C-channels (6 and 8) concurrently with welding robot (18).

4. The process of claim 1 wherein the robotic arm (10) also handles the first C-channel (6) and securely places it on the welding table (2).

5. The process of claim 1 wherein the robotic arm (10) handles the second C-channel (8) and places it aligned with the first C-channel (6) and holds the second C-channel (8) in place during the welding operation.

6. The process of claim 1 wherein the set of pressure-exerting tools (26) includes channel grasps (14 and 16) that hold the second C-channel (8) away from its edges while being handled and then while held in position against the first C-channel (6) during the welding operation.

7. The process of claim 1 wherein the welding operation is continuous.

8. A method of manufacturing a side-rail for a vehicle having joined a first C-channel (6) and a second C-channel (8) with cavities of the first C-channel (6) and the second C-channel (8) inwardly facing, the method comprising the steps of:
  placing the C-channels (6 and 8) with a robotic arm (10) with the cavities of the C-channels (6 and 8) inwardly facing on a welding table (2) that is fixed at an angle between 45° and 65° from horizontal;
  holding the second C-channel (8) with a pressing tool (12) having channel grasps (14 and 16) that hold the second C-channel (8) away from its edges to be welded while first being handled and then while held in position against the first C-channel (6);
  using a seam finding system (24) in conjunction with first and second welding robots (18 and 20) to sense a seam between the first and second C-channels (6, 8);
  providing input from each seam finding system (24) to precisely position each of the first and second robots (18 and 20); and
  welding the first and second C-channels (6 and 8) together concurrently with the first welding robot (18) and the second welding robot (20) on opposite sides of the welding table (2) to form the side-rail.

9. The method of claim 8 wherein welding is continuous from top to bottom along the entire length on each side of the C-channels (6 and 8).

10. The method of claim 8 wherein the welding table (2) is approximately 55° from horizontal.

11. The method of claim 8 wherein the robotic arm (10) first handles the first C-channel (6) and securely places it in a holding element (22) on the welding table (2), and then the robotic arm (10) handles the second C-channel (8) and places it aligned with the first C-channel (6) and holds the second C-channel (8) in place with the pressing tool (12) during the welding of the first and second C-channels (6 and 8) together.

12. The method of claim 8 wherein the seam finding system (24) is a camera-vision system that provides input so the welding robots (18 and 20) go to the exact position to weld.

* * * * *